United States Patent
Pfeiffer

(10) Patent No.: US 6,671,468 B1
(45) Date of Patent: Dec. 30, 2003

(54) LIGHT SOURCE AND METHOD FOR THE TRANSMISSION OF SPECTRALLY CODED DATA

(75) Inventor: Thomas Pfeiffer, Stuttgart (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/313,982

(22) Filed: May 19, 1999

(30) Foreign Application Priority Data

May 20, 1998 (DE) ......................... 198 22 616

(51) Int. Cl.[7] ............... H04B 10/04; H01S 3/13
(52) U.S. Cl. ............ 398/197; 398/187; 398/188; 398/189; 398/193; 398/194; 398/198; 372/29.014; 372/29.015; 372/29.02; 372/29.01
(58) Field of Search ............... 359/136, 181, 359/182, 183, 188; 398/182, 183, 187, 188, 198, 193, 186, 192, 194; 372/26, 28, 29.014

(56) References Cited

U.S. PATENT DOCUMENTS

| | | | | |
|---|---|---|---|---|
| 4,768,186 A | * | 8/1988 | Bodell ........................ 370/3 |
| 5,200,964 A | * | 4/1993 | Huber ......................... 372/26 |
| 5,432,629 A | * | 7/1995 | Shikada et al. ............ 359/124 |
| 5,631,758 A | * | 5/1997 | Knox et al. ................ 359/127 |
| 5,699,179 A | * | 12/1997 | Gopalakrishnan ........... 359/183 |
| 5,742,418 A | * | 4/1998 | Mizutani et al. ............ 359/156 |
| 5,831,761 A | * | 11/1998 | Chraplyvy et al. ......... 359/341 |
| 5,850,408 A | * | 12/1998 | Ouchi et al. ................ 372/27 |
| 6,134,037 A | * | 10/2000 | Shabeer et al. ............. 359/181 |

FOREIGN PATENT DOCUMENTS

| | | |
|---|---|---|
| DE | 34 06 838 C2 | 8/1984 |
| DE | 35 09 354 A1 | 9/1986 |
| DE | 36 09 278 A1 | 9/1987 |
| DE | 39 15 625 A1 | 11/1990 |
| DE | 43 10 578 C2 | 10/1993 |
| DE | 196 05 567 A1 | 8/1997 |
| DE | 197 23 103 A1 | 12/1998 |
| DE | 197 23 103.9 | 12/1998 |
| EP | 0 319 242 A2 | 6/1989 |
| EP | 0 683 552 A2 | 11/1995 |
| EP | DE 196 20 723 A1 | 11/1997 |
| EP | 0 847 116 A2 | 6/1998 |
| JP | 8-78790 | 3/1996 |

* cited by examiner

*Primary Examiner*—Jason Chan
*Assistant Examiner*—M. R. Sedighian
(74) *Attorney, Agent, or Firm*—Sughrue Mion, PLLC

(57) ABSTRACT

A light source with a broadband frequency-periodic output spectrum for digital spectrally coded data, whereby the light source consists of a solid state laser that is frequency-modulated or phase-modulated within one bit period.

11 Claims, 2 Drawing Sheets

LIGHT SOURCE AND METHOD FOR THE TRANSMISSION OF SPECTRALLY CODED DATA

This application is based on and claims the benefit of German Patent Application No. 198 22 616.0 filed May 20, 1998, which is incorporated by reference herein.

BACKGROUND OF THE INVENTION

This invention relates to a light source and to a method for the transmission of digital, spectrally coded data as described in the introductory portion of claim 1.

The prior art, e.g. German Patent Application 197 231 03.9, discloses transmission methods that utilize spectral coding. Such an optical transmission network consists of optical transmission lines and optical splitters and may also include optical amplifiers, and is used to transmit coded, multiplexed optical signals. Each transmitter contains a coder in which the signals to be transmitted are coded before they are transmitted into the optical transmission network. The coding is done optically, e.g. by frequency coding with an optical filter. Each receiver that wants to receive the data from a specific transmitter, must contain a decoded that is tuned to the coder of this specific transmitter. In the simplest case, the frequency ranges that pass optical signals and the frequency ranges that block optical signals are the same in the coder and in the decoder. This decoding method is known by the term CDMA (Code Division Multiple Access). In these systems, light-emitting diodes are used, the broadband emission spectrum of which passes through an optical filter. The optical filter can, for example, be a Fabry-Perot filter which converts the broadband spectrum into a frequency comb. A significant disadvantage of these systems of the prior art is the low optical output of the broadband light sources that are available. The light-emitting diodes currently used emit around 1,550 nm, and even then with a very low output (<0.1 milliwatt), which in connection with passive optical filters leads to transmission outputs in the range of approximately 30 $\mu$W. Such systems therefore always require an optical amplifier.

SUMMARY OF THE INVENTION

The light source claimed by the invention, with the characterizing features disclosed in the independent claims, has the advantage over similar systems of the prior art that significantly higher outputs can be achieved, which therefore makes it possible to do without an optical amplifier. The broadband frequency comb, which is necessary for the use of the CDMA method, is actively created. Thus the injection current of the solid state laser within a bit period can be frequency-modulated or phase-modulated in the shape of a sine-wave.

Advantageous refinements and improvements to the light sources disclosed in the independent claims can be achieved by means of the measures disclosed in the subclaims. It is particularly advantageous that the spectral width of the frequency periodic output of the solid state laser is determined by the ratio of the frequency shift and the modulation frequency, and is therefore adjustable.

A DFB (Distributed Feedback Laser) is advantageously used. A Fabry-Perot laser can also be used as the light source for the CDMA method.

BRIEF DESCRIPTION OF THE DRAWING

One exemplary embodiment of the invention is illustrated in the accompanying drawing and is described in greater detail below.

DETAILED DESCRIPTION OF THE INVENTION

Figure 1:
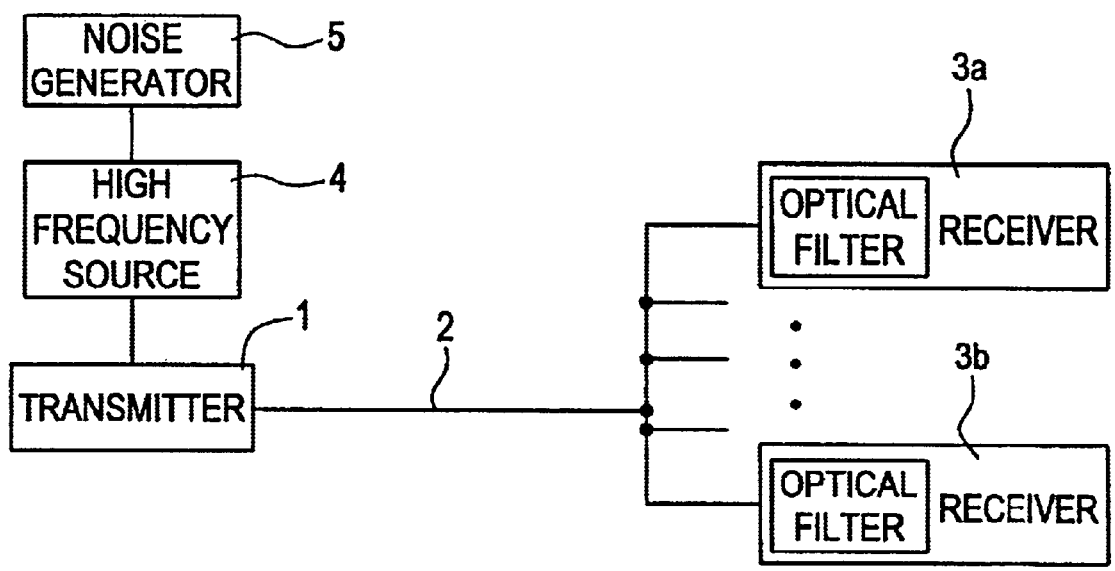
FIG. 1 shows a transmission system as claimed by the invention.

FIG. 1 shows a transmitter 1 which is in communication by means of a transmission line 2 with receivers 3A, 3B etc. The transmitter 1 is in communication with a high-frequency source 4. The high-frequency source in this embodiment is also in communication with a noise generator 5.

Figure 2:
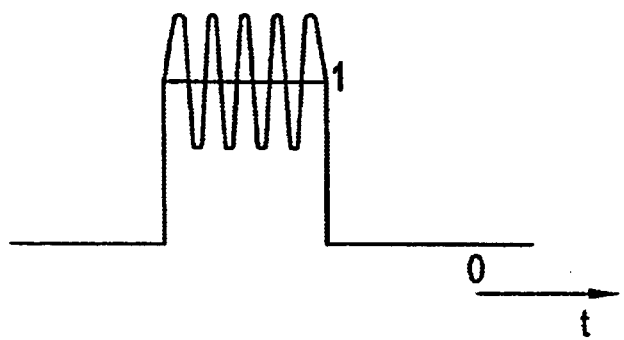
FIG. 2 is a schematic diagram of the signal modulation.

FIG. 2 is a schematic illustration of a signal bit 1 on which the high-frequency signal is superimposed. The modulated signal is transmitted, and is detected on the receiver side after it has passed through a specially tuned filter of the receiver.

Figure 3:
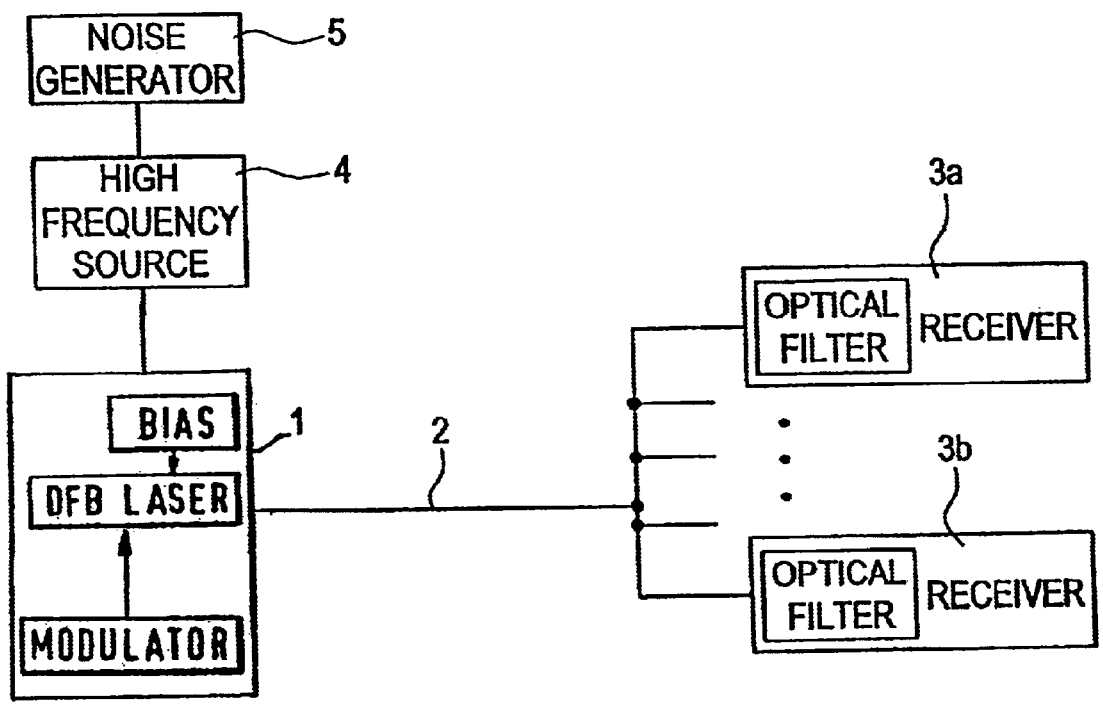
FIG. 3 shows an embodiment of a transmitter 1, wherein the transmitter 1 includes a laser, a modulator, and a bias.

FIG. 3 shows an embodiment of a transmitter 1, wherein the transmitter 1 includes a laser, a modulator, and a bias.

The realization of the spectral comb can be selected as a function of the different periods. The spectral coding of the signals is always read by a receiver that has the corresponding filter devices.

The fundamental advantage of this invention is that a light source is made available that actively generates an optical comb with a frequency-periodic spectrum, and contains as many equidistant lines as possible with a high integral laser power. The integral laser power is thereby greater than 1 mW. The spectral coding via the modulation of the injection current can be very flexibly adapted to the transmission conditions and to the number and performance of the respective receivers. For that purpose, a solid state laser is modulated for the duration of a bit period. A bit period, at a bit rate of 10 Megabits per second, indicates a period of 100 ns. It must be possible to frequency-modulate or to phase-modulate the solid state laser within this length of time. For that purpose, a small, high-frequency modulation current is added to the injection current of the solid state laser. The modulation current can modulate the injection current at a frequency of 100 MHz, for example. As a result of the modulation of the injection current of the solid state laser, there is a frequency-modulated or phase-modulated output spectrum of the laser, the spectral width of which is indicated by a modulation index m. This modulation index m corresponds approximately to the number of lines. It is a function of the quotient of the frequency shift or phase shift and the modulation frequency. The frequency shift is proportional to the amplitude of the high-frequency modulation current, which modulates the injection current with the modulation frequency. To generate 100 spectral lines at a 100 MHz modulation frequency, the frequency shift must be 10 GHz. For such a modulation shift of 10 GHz, an additional modulation current of a few mA is necessary. The additional modulation of the injection current within a bit period can be applied to the DFB lasers in current use without any problems. If Fabry-Perot lasers are used, the intervals between the longitudinal modes of the laser emission must be set so that they correspond to an integer multiple of the modulation frequency. Such a setting can be made by tempering the Fabry-Perot laser.

The spectral coding in a transmission system using a modulated laser light source is done by specifying the distance between the periodic spectral components. For each receiver, a special frequency comb is thereby available, the interval of which is specific for the corresponding receiver.

The coding therefore takes place via the modulation frequency, which is set accordingly. The modulation frequency determines the distance of the lines from one another. In this transmission method, therefore, different bit-by-bit frequency combs could be generated, the line interval of which is typical. Further, the ratio of the spectral line widths to the line interval is approximately 1:30. The transmission method, which can be used with a particularly simple and economical transmitter, works up to bit rates of approximately 10 MHz.

Each receiver has an optical filter. Only signals with the code defined for this receiver pass through the optical filter and can be detected. In general, with a filter curve with a $\sin^2$ curve, the maximum of the central spectral line is detected. Therefore it is possible in a simple manner to transmit a "1" or a "0". With a 1, the transmitter emits a spectral comb and the receiver detects the central line. For a zero, the operating point is shifted so that the emission of the spectral comb is shifted by one-half the line interval. The receiver now detects a "0" in the central position.

The use of an active laser light source as the light source for a CDMA transmission method can be further optimized. The laser light source claimed by the invention delivers very narrow lines without interference. Under certain transmission conditions, the use of very narrow lines can result in a complete loss of the information. The bit error rate can be reduced if the spectral lines are made slightly wider. For this purpose, a phase noise is superimposed on the high-frequency signal. In the simplest case, a noise oscillator 5 that is connected with the high-frequency generation can be used for this purpose.

The transmission method also works with the use of conventional light sources with external modulators. In this case, the optical fiber line is not as large, but the transmission capabilities correspond to the form described above.

What is claimed is:

1. A light source that supplies a broadband, frequency periodic output for the transmission of digital, spectrally coded data (CDMA method), comprising:
    a solid state laser light source;
    a bias for supplying injection current to said laser light source;
    a modulator connected to said laser light source so as to produce a frequency periodic output of bits; and
    a second modulator, connected to said bias, in order to frequency modulate the output of said laser light source within a bit period by acting on said bias.

2. A light source that supplies a broadband, frequency periodic output for the transmission of digital, spectrally coded data (CDMA method), comprising:
    a solid state laser light source;
    a bias for supplying injection current to said laser light source;
    a modulator connected to said laser light source so as to produce a frequency periodic output of bits; and
    a second modulator, connected to said bias, in order to phase modulate the output of said laser light source within a bit period by acting on said bias.

3. A light source as claimed in claim 1, characterized in that said second modulator is a high-frequency source.

4. A light source as claimed in claim 1, characterized in that the spectral width of the frequency-periodic output is defined by the ratio of the frequency shift Δf or phase shift and modulation frequency $f_m$.

5. A light source as claimed in claim 1, characterized in that the solid state laser light source is a DFB (Distributed Feedback) laser.

6. A light source as claimed in claim 1, characterized in that the laser light source is a Fabry-Perot laser and the mode interval is an integer multiple of the modulation frequency.

7. A light source as claimed in claim 1, characterized in that the line shape of the light source is influenced by additional actuation with a noise signal.

8. A light source as claimed in claim 1, characterized in that the ratio of the spectral line widths to the line interval is approximately 1:30.

9. A light source as claimed in claim 1, characterized in that a switch from Bit "1" to Bit "0" for a spectrally coded channel is made by a shift of the operating point of the laser.

10. A method for the spectral coding of data using a laser light source as claimed in one of the preceding claims, characterized in that the coding is done bit-by-bit by varying the modulation index.

11. A method for the spectral coding of data using a broadband light source with a downstream filter, comprising:
    generating a bit stream of light pulses using a light source comprising a laser light source, a bias for supplying injection current to said laser light source, and a modulator connected to the laser light source so as to produce a periodic output of bits; and
    coding said bits by a bit-by-bit variation of the modulation index by means of an external modulator acting on said bias.

* * * * *